United States Patent
Shapiro

(10) Patent No.: US 10,279,785 B1
(45) Date of Patent: May 7, 2019

(54) METHOD AND APPARATUS FOR RECOVERING ENERGY WHEEL

(71) Applicants: Benjamin Shapiro, Huntington Beach, CA (US); Gabriel Shapiro, Huntington Beach, CA (US); Roman Shapiro, Cedar Grove, NJ (US)

(72) Inventor: Benjamin Shapiro, Huntington Beach, CA (US)

(73) Assignee: REWHEEL, INC., Dover, DE (US)

( * ) Notice: Subject to any disclaimer, the term of this patent is extended or adjusted under 35 U.S.C. 154(b) by 0 days.

(21) Appl. No.: 15/715,136

(22) Filed: Sep. 25, 2017

(51) Int. Cl.
*B60T 1/10* (2006.01)
*B60K 6/12* (2006.01)
*F16D 61/00* (2006.01)
*B60T 1/08* (2006.01)
*F16D 57/02* (2006.01)
*F16D 121/02* (2012.01)
*F16D 125/44* (2012.01)

(52) U.S. Cl.
CPC ............ *B60T 1/10* (2013.01); *B60K 6/12* (2013.01); *B60T 1/08* (2013.01); *F16D 57/02* (2013.01); *F16D 61/00* (2013.01); *B60Y 2304/076* (2013.01); *B60Y 2400/14* (2013.01); *B60Y 2400/15* (2013.01); *F16D 2121/02* (2013.01); *F16D 2125/44* (2013.01)

(58) Field of Classification Search
CPC ........ B60T 1/10; F16D 61/00; Y02T 10/6208; B60K 6/12
USPC ............... 60/414; 180/308, 165; 290/54
See application file for complete search history.

(56) References Cited

U.S. PATENT DOCUMENTS

| | | | | |
|---|---|---|---|---|
| 3,932,076 A | * | 1/1976 | Thibault | B60K 7/0015 180/242 |
| 4,061,200 A | * | 12/1977 | Thompson | B60K 25/08 180/165 |
| 4,069,669 A | * | 1/1978 | Pitkanen | B60K 6/105 416/60 |
| 4,111,618 A | * | 9/1978 | Thibault | F01C 1/3566 180/308 |
| 4,223,532 A | * | 9/1980 | Shiber | B60K 6/12 60/414 |
| 4,364,229 A | * | 12/1982 | Shiber | B60K 6/105 60/414 |
| 4,663,935 A | * | 5/1987 | Rohde | B60C 5/004 417/233 |
| 5,323,688 A | * | 6/1994 | Walker | B60K 6/12 180/242 |

(Continued)

FOREIGN PATENT DOCUMENTS

| | | | | |
|---|---|---|---|---|
| GB | 2346193 A | * | 8/2000 | ............ B60T 1/065 |
| GB | 2348673 A | * | 10/2000 | ............ B60T 1/10 |
| JP | 57186520 A | * | 11/1982 | ............ B60K 25/08 |

*Primary Examiner* — Ruth Ilan

(57) ABSTRACT

The present invention introduces a retrofit method of regenerative braking where no components of an automobile are to be replaced or removed and not of their functionality is modified. The recovering energy system is implemented as an additional, one piece, complete device, placed onto the existing automobile wheel's hub, and covered by the automobile's wheel. The system includes a housing, turbines, accumulators, and valves which act to both store and dispel energy as needed. This method of regenerative braking is therefore applicable to all the automobiles, independent or their power source, to newly built automobiles and those already on the road.

4 Claims, 2 Drawing Sheets

(56) References Cited

U.S. PATENT DOCUMENTS

| | | | | |
|---|---|---|---|---|
| 5,799,562 | A * | 9/1998 | Weinberg | F01B 3/02 60/414 |
| 6,719,080 | B1 * | 4/2004 | Gray, Jr. | B60K 6/12 180/165 |
| 7,263,828 | B2 * | 9/2007 | Iwanami | F01C 13/00 290/43 |
| 7,992,948 | B2 * | 8/2011 | Swain | B60K 6/12 188/24.11 |
| 2003/0019675 | A1 * | 1/2003 | Haas | B60K 7/0007 180/65.6 |
| 2005/0178115 | A1 * | 8/2005 | Hughey | B60K 6/12 60/413 |
| 2006/0137927 | A1 * | 6/2006 | Fleming | B60K 6/48 180/165 |
| 2010/0219681 | A1 * | 9/2010 | Rini | B60K 6/12 303/152 |
| 2011/0100740 | A1 * | 5/2011 | Schneidewind | B60K 6/105 180/165 |
| 2011/0180340 | A1 * | 7/2011 | Peaslee | B60K 6/12 180/165 |
| 2014/0166387 | A1 * | 6/2014 | Achten | B60K 6/12 180/242 |
| 2014/0219848 | A1 * | 8/2014 | Rabhi | F16C 33/306 418/24 |
| 2015/0204354 | A1 * | 7/2015 | Krittian | B60K 6/12 60/413 |
| 2016/0114670 | A1 * | 4/2016 | Resch | B60B 27/0015 180/308 |

* cited by examiner

METHOD AND APPARATUS FOR RECOVERING ENERGY WHEEL

The present invention relates to several key issues:
protecting and improving the quality of the environment
saving energy resources and minimizing the need for importing additional energy resources
making driving automobiles more affordable

TECHNICAL FIELD

1. Field of the Invention

The invention relates generally to conserving the energy and protecting the planet's environment More precisely it relates to the different methods of conservation of kinetic energy of automobiles via regenerative braking, and capturing and saving this energy within an automobile.

2. Background of the Invention

Natural resources are too valuable to be wasted.

Natural resources used to produce fuel for automobile combustion engines are too valuable. Producing the electricity, which is required to power electrical cars, for the most part also still requires burning the same fossil fuels, oil, gas, and coal.

US Consumption of Gasoline

"In 2014, about 136.78 billion gallons' (or 3.26 billion barrels) of gasoline were consumed[2] in the United States, a daily average of about 374.74 million gallons (or 8.92 million barrels).[3] This was about 4% less than the record high of about 142.35 billion gallons (or 3.39 billion barrels) consumed in 2007." http://www.eia.gov/tools/faqs/faq.cfm?id=23&1=10

Price of Gas

"The average price of gas in February was $2.23 per gallon, which was the cheapest February average since 2009. The average in February 2014 was $3.34 per gallon". (last to years average=$5.57/2=$2.77/per gallon)"

newsroom.aaa.com/tag/gas-prices/

That is, yearly expenses for consumers to fill their cars with gas represent 136.78 billion gallons×$2.77/gallon=$378.88 billion/

US Oil Import Expenses

"The United States imported approximately 9 million barrels per day (MMbbl/d) of petroleum in 2014 from about 80 countries."

http://www.cia.gov/tools/faqs/faq.cfm?id=727&t=6

31.5 gallons/barrel×9 million barrels=283.5 Million gallons/day 103.5 billion gallons/year out of 136.78 billion gallons is imported.

BACKGROUND ART

Re: Regenerative Braking

Regenerative braking is the method of saving kinetic energy within the automobile's system during the braking process.

When no kinetic energy of a moving automobile is saved within the system of the automobile by being converted into some other form of energy at the time of applying the breaks, all that energy that was generated (for example by a combustion engine) and applied into giving this automobile a specific momentum, is lost That energy is lost into destruction of matter (brakes) and heat produced during that process. The heat is released into the atmosphere and the destructed material (brakes) will require replacement.

Known methods of regenerative braking (https://en.wikipedia.org/wiki/Regenerative_brake) or "kinetic energy recovery system" (https://en.wikipedia.org/wiki/Kinetic_energy_recovery_system) include:

(a) fly wheel—proven not practical for the reason (too heavy, not allowing to change the direction of the automobile—horoscope effect—saving its own momentum of movement, loosing this saving energy with time)

(b) electrical engine working in electrical generator mode, and (c) a relatively new technology of keeping transformed kinetic energy within compressed gas tanks requiring a reworked transmission system, hydraulic pumps and several gas tanks.

Example

"The Hybrid Air Powertrain uses a hydraulic pump and a piston to the nitrogen gas in a tank called the high-pressure accumulator.

Hitting the accelerator releases the pressurized gas, which then moves hydraulic fluid through the same pump in reverse. The pump acts as a motor to power the wheels and the hydraulic fluid ends up in a second tank.

The Hybrid Air Car uses compressed nitrogen, which is held in a tank called the high-pressure accumulator.

A hydraulic pump and piston compress nitrogen in the accumulator.

When the nitrogen is released (by pressing the accelerator), the pump runs in reverse. Acting now as a motor, harnesses the energy of the moving hydraulic fluid to send power to the wheels. After the hydraulic fluid passes through the motor, it flows to the low-pressure accumulator, where it is stored for later use." (see pic. Car-runs-air) http://www.popsci.com/article/cars/car-runs-air"

The above described technology (c) forcing for replacing the power train, is in effect rebuilding the automobile. In contrast, the presented here invention is only requiring an addition to the existing automobile's wheel.

Re. Electric Cars

While the battery life keeps increasing with new inventions, the drawbacks are in the following. Electricity still has to come from somewhere. The most common way of generating electricity today is still by burning fossil fuels. i.e. gas, coal, and oil, which still pollutes the atmosphere and thus defeats the promise of green energy for electrical cars.

Regenerative Braking within Electrical Cars.

The process of charging electrical batteries takes time. The efficiency of this process is low. The part of the amount of an automobile's kinetic energy (which is saved by an electrical motor working in generator mode) is insignificant for the reason of a relatively low amount of electricity generated in this mode and the speed at which a battery can accumulate the charge. The relatively small motor/generator within an automobile can not produce the same electrical power that is obtained from a high voltage electrical line being used to charge these batteries overnight

SUMMARY OF THE INVENTION

The tradition holds that a wheel is to be driven by some other device, i.e. an engine. The understanding that a wheel can itself be its own engine is a fundamentally new. The present invention re-invents the wheel by having it serve as its own engine.

The kinetic energy of the automobile is absolutely represented by the rotation of the wheel. While traditionally the wheel is the target of an engine, this device constructed on the wheel itself, is allowing the wheel to power itself.

To better understand the reasoning behind the invention please imagine the following:
- (i1) if there would be no losses of energy caused by the friction between the tire and the road AND
- (i2) if there would be no losses of energy due to the air resistance to the moving vehicle
- THEN giving the car the original momentum of movement, capturing all that kinetic energy during braking and then reapplying that same energy for acceleration, would require no additional power (electrical or combustion engine power).

It is, of course, not possible to have such ideal conditions (i1) and (i2) so the external power constantly substituting for the losses would always be needed. Additionally, some loss of energy is still unavoidable during the process of the conversion from the automobile's kinetic energy to the potential energy saved within the automobile, the efficiency of the energy conservation within the described here apparatus is much higher than can be provided by an electrical engine working in electrical generator mode.

The presented here invention is different from known in the art methods of conserving kinetic energy of automobile via regenerative braking. The apparatus of this invention is built on top of traditional automobile's wheels. Therefore, the only component affected when implementing this technology of energy conservation on the automobiles already on the road or newly constructed automobiles is the wheel and does not require the reconstruction of the entire powertrain like in the mentioned above example (c).

Being built on the wheel, this technology offers the application to all the automobiles independent of the energy source used to power them. It is applicable to the existing on the road automobiles as well as to the newly designed automobiles.

Applications of the Method and Apparatus for Recovering Energy Wheel (ReWheel) to Traditional Automobiles Presented here system and apparatus is not using electricity or gasoline for its power.

It, however, can be added for additional power and as an energy saving device to any existing on the road today automobile as simply as it is to replace the wheel. The original wheels are still being used. The operation can be performed by any auto mechanic or mechanically oriented auto user.

The effects are all of the following:
- providing additional saving to the world's natural resources
- minimizing air pollution done today by excessive use of combustion engines and by excessive production of electricity
- allowing for less expenses for the auto users going into powering their vehicles
- providing additional power to automobiles on all the wheels where the device is installed
- consequently, upgrading two wheel powered automobiles into four wheel powered automobiles This upgrade is possible for all existing types of automobiles, including the following:
- traditional combustion engine automobiles;
- electric automobile
- hybrid automobiles
- from any other type of energy powered automobiles The use of ReWheel device requires the following three (3) simple steps to be done on either two (2) or all four (4) wheels of the automobile:
1. Taking off the original wheel
2. Putting the ReWheel device on the place of the original wheels
3. Attaching the original wheel to the ReWheel device.

BRIEF DESCRIPTION OF THE DRAWINGS

Presented here invention can be readily understood by considering the following detailed description with the accompanying drawings.

DETAILED DESCRIPTION OF THE PREFERRED EMBODIMENT

Figure 1:
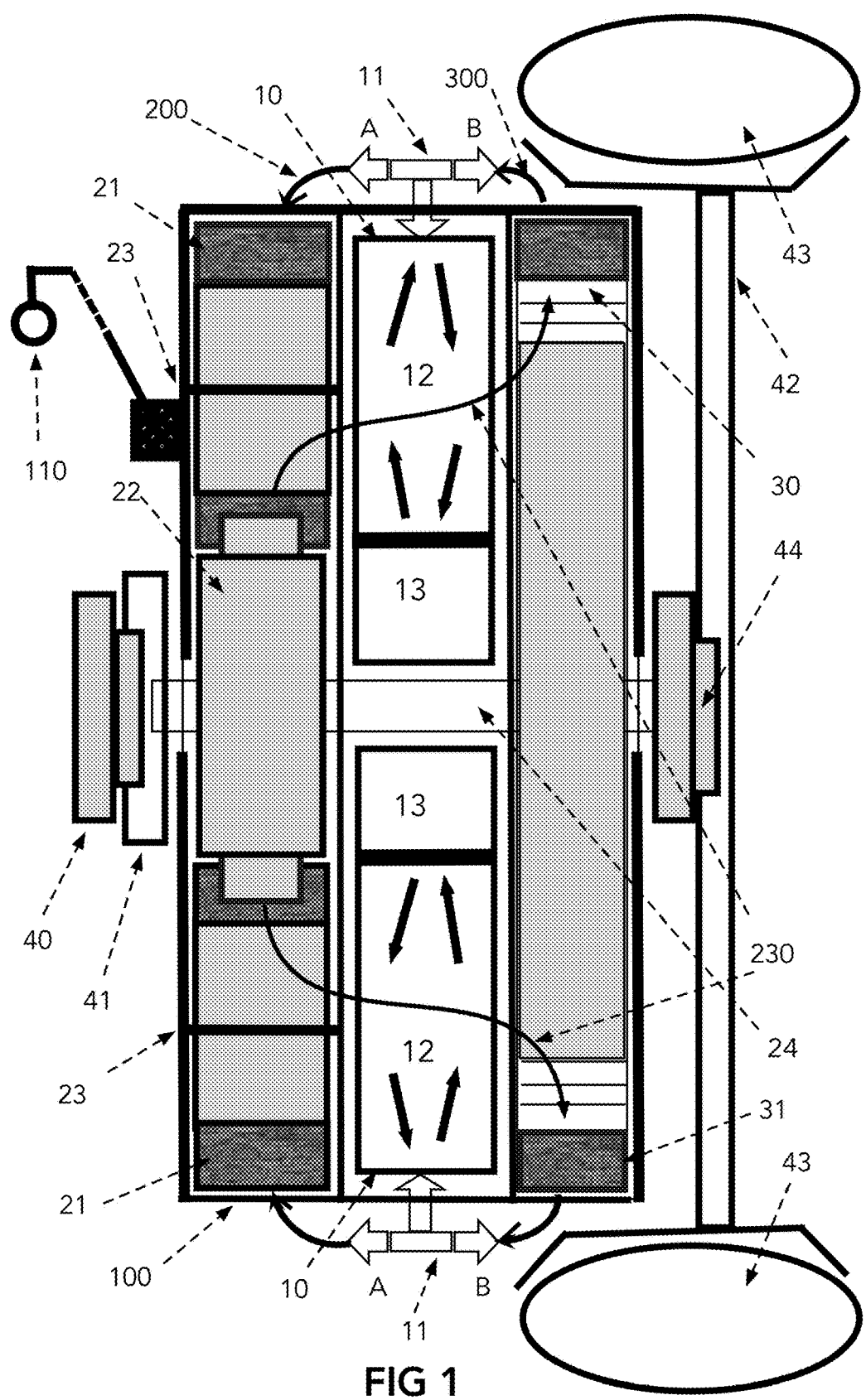
FIG. 1. The ReWheel Device—Preferred embodiment
- 100 ReWheel body
- 110 Stationary Connector
- 200 Fluid Stream at Acceleration Time
- 230 Fluid Passage Back to Braking Turbine
- 300 Fluid Stream at Braking Time
- 10 Accumulator
- 11 3-way valve
- 12 Pressured Fluid
- 13 Pressured Gas
- 21 Accelerator Gear Blades
- 22 Central Gear
- 23 Accelerator Gear Axle
- 24 Extended Axle
- 30 Braking Turbine
- 31 Braking Turbine Blades
- 40 Original Hub
- 41 Connector to Original Hub
- 42 Original Tire Rim
- 43 Original Tire
- 44 Secondary Hub FIG. 2. The ReWheel Device—Alternative Embodiment.
- 7A open/close valves
- 7B open/close valves
- 700 Cone or other gear type is controlling the speed. Connection is made during braking
- 701 This turbine is locked to the rim
- 702 Rim
- 709 When the breaking turbine axle moves to the left to perform the braking, air pumping
- pistons get connected to the power-train axle
- 721 Accelerator turbine
- 724 Extended axle
- 730 Braking turbine
- 741 Reverse Rotation direction disk with controlled speed
- 742 Sitting on the extended wheel's axle disk
- 743 Tire
- 7200 At acceleration time, the compressed gas, pressing on the liquid is forcing the acceleration turbine blades forward
- 7230 Passage between the accelerating turbine and braking turbine. Error shows direction of liquid during braking
- 7300 At braking time the liquid from the breaking turbine is forcing the acceleration turbine backwards while compressing the air

Referring to FIG. 1, the ReWheel (Recovering Energy Wheel) device, of the shape of a cylinder, is added to the traditional automobile's wheel in the place between the traditional Rim and the traditional wheel Hub.

The ReWheel device operates like a powerful spring placed inside the automobile's wheel, transforming the kinetic energy of a moving automobile into potential energy of compressed gas during the braking process and then transforming back that potential energy of compressed gas into kinetic energy of the automobile during acceleration process.

The ReWheel device is connected to the Original Hub (40) sitting on the original wheel, by the Original Hub Connector (41). Original Hub Connector (41) extends the original axle by the Extended Wheel Axle (24), going all the way until the Secondary Hub Connector (44).

The Original Hub Connector (41), is taking the place that would normally be taken by the Original Tire Rim (42). The Original Tire Rim (42) with mounted on it Original Tire (43) is being connected instead to the Secondary Hub Connector (44).

The body of the device, ReWheel Body (100), is kept stationary by the Stationary Connector (110). The Stationary Connector (110) is, in turn, connected to the part of an automobile's tire suspension system, which is always stationary to the wheel's axle. It can, for example, be connected to the upper ball joint or its equivalent This FIG. 1. shows two accumulators (10) located in the direction of radius coming out of the Extended Wheel Axle (24), having their pressured gas side towards the axle. The ReWheel device can utilize multiple accumulators, each of them being connected to 3-Way-Valves (11) without changing the principle of the device's operation.

There are number of turbine-like components within this implementation of the ReWheel. One, is the Braking Turbine (31) and the others are the Accelerator Gears (21). This implementation shows two Accelerator Gears (21) standing on the opposite sides of the Central Gear (22), which is being driven by the Accelerator Gears (21). The Central Gear (22) is hard connected to and is rotating on the Extended Wheel Axle (24).

The Accumulators (10) are pre-charged with Pressured Gas (13), inert gas, like Nitrogen. Originally the other side of the accumulator is not charged. The Pressured Fluid (12) then comes to the accumulator during the braking process and further compressing the Pressured Gas (13). Since the fluid we use in this implementation is oil which is virtually non compressible under pressure, and since it can change its shape and direction based on the pipes it is going through, makes it a perfect conductor of force.

The 3-Way Valves (11) controlled by any mechanical or electronic device, are, in turn controlling the braking and acceleration of the automobile. They can be in any of the following 3 states: Neutral state—when all Braking (B) and Accelerating (A) valves are closed; Acceleration state, when braking valves (B) are closed and acceleration valves (A) are open, causing Fluid Stream at Acceleration Time (200), which in turn is causing the Accelerator Gears (21) to rotate faster, in turn rotating the Central Gear (22); and Braking state, when accelerating valves (A) are closed and braking valves (B) are opened, causing Fluid Stream at Braking Time (300), which is causing further compression of the Pressured Gas (13) and further charging the accumulators with potential energy of compressed gas (13), which process is in turn causing the automobile to brake as every force has a counter force.

The change in the state of the device, causing braking of the the automobile and transforming the energy from kinetic to potential is implemented as follows. At the neutral state of the device (no braking and no acceleration) the Braking Turbine (30), hard connected and positioned on the Extended Wheel Axle (24) is rotating along with the Original Tire (43). The fluid positioned between the Braking Turbine Blades (31) rotates without any pressure applied to it.

The Fluid inside the ReWheel device for the largest part is always located between the blades of the Braking Turbine (30) and in compressed state (12) within Accumulators (10).

Braking State.

When braking of the automobile is desired, the following is done: Port B of the 3-Way-Valve (11) is opened (port A can only be closed at this time); and special blocks are set to move out and back in to block the free rotation of the fluid.

The movement of the blocks is synchronized with the rotation of the blades not to block the blades and to only block the liquid in between the blades.

Blocking the liquid is putting pressure on the Braking Turbine Blades (31). Since the Braking Turbine (30) is placed on the same Extended Axle (24) as the Original Tire Rim (42), blocking the liquid works against the rotation of the Original Tire (43). The inertia of the moving car is creating the counter force, which in turn forces the Fluid Stream at Braking Time (300) in the accumulators (10) through the, open at this time, port B of the 3-Way-Valve.

Acceleration State.

When acceleration of the car is desired, port A of the 3-Way-Valve (11) is opened (port B can only be closed at this time).

The Pressured Gas (13) is then able to force the Pressured Liquid (12), creating the Fluid Stream at Acceleration Time (200) to hit the Blades of the Accelerator Gears (21). The Accelerator Gears (21) are in turn rotating the connected to them Central Gear (22), which is standing on the same Extended Axle (24) connected to the Original Rim (42). Used during the acceleration process liquid is then passed back to the Braking Turbine blades (31), via the Fluid Passage back to Braking Turbine (230). At this time the braking turbine is rotating without a load, with no pressure on its blades, and with available space for the liquid in between its blades.

Neutral State.

Both ports of the 3-Way-Valves (11) are closed. All the turbines are rotating freely.

DETAILED DESCRIPTION OF THE ALTERNATIVE EMBODIMENT

Figure 2:
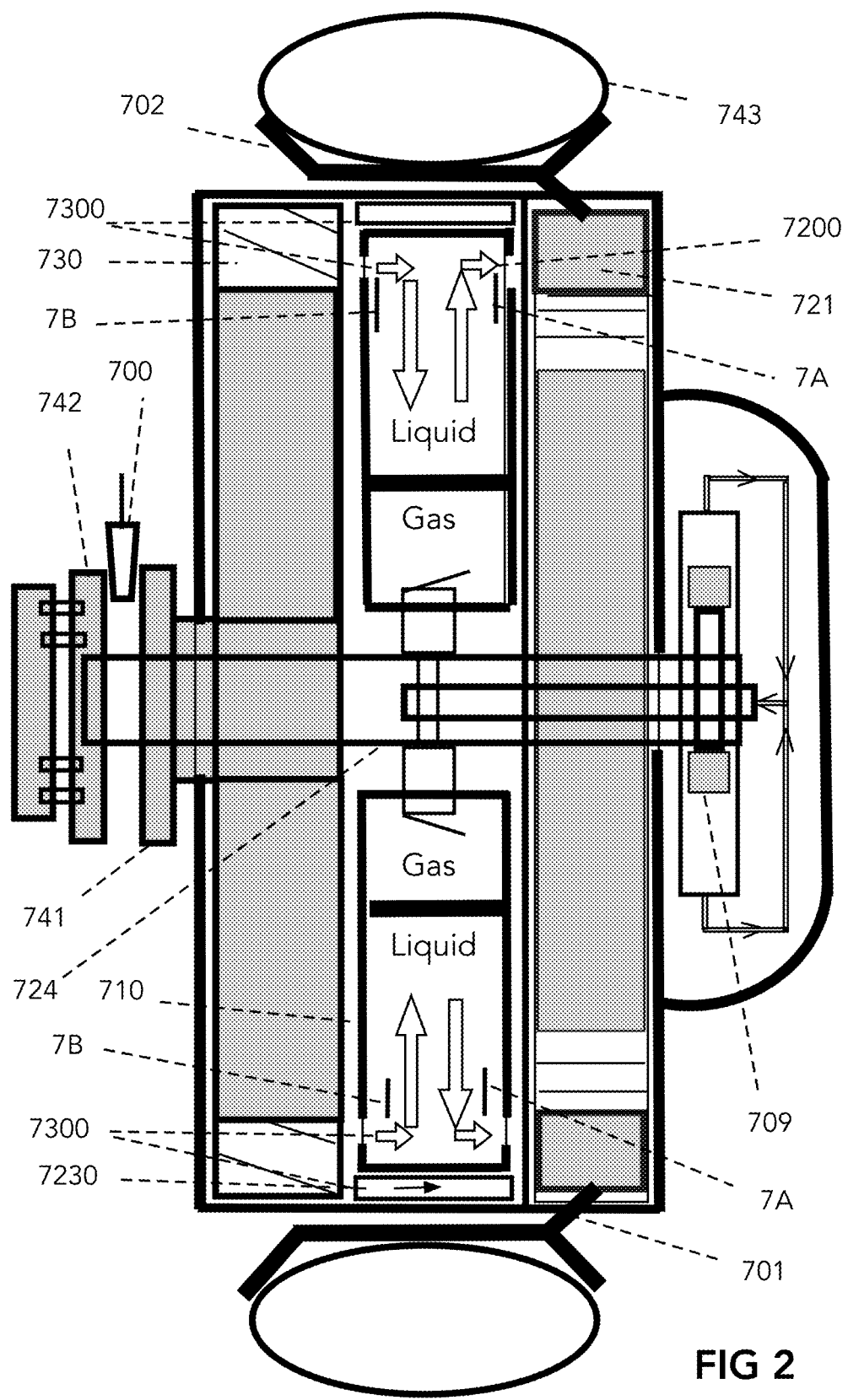

FIG. 2. Shows Alternative Embodiment,

This figure is also showing two volumes within high pressure cylinders (accumulators). One side of each cylinder is filled with liquid and the other side with gas.

Here, as well, the accumulators are used within the construction being an addition to the automobile wheel's rim and positioned on the extended automobile wheel's axle.

Here, as well, the gas compressed during the deceleration of the automobile serves as the storage of energy.

Here, as well, the liquid is being the conduit of force between the pressure on the blades within the rotating turbines and compressed gas. At times the gas is referred to as "air", however the only important qualities of these components are "liquid" and "gas". An inert gas, i.e. nitrogen, is more appropriate in this case.

The turbines, sitting on the same axle as the wheel's rim, affect the rotation of the rim. On this FIG. 2 we have depicted two turbines, the braking turbine (730) on the left and the accelerating turbine (721) on the right, with the two accumulators (710) in between. Rim (702), locked, by the connection 701, to the the accelerating turbine (721) on the right, placed on the gears of the extended wheel's axle (724), i.e. both are always rotating with the same speed.

Acceleration:

The compressed gas which is pressing on the liquid, which in turn is pressing on the specially angled blades of the acceleration turbine (721), is causing the acceleration. The used for acceleration liquid is then allowed to come in between the blades of the braking turbine (730) on the left via the passage between the accelerating turbine and braking turbine (7230).

At this time the braking turbine (730) and the liquid between its blades are freely rotating in the same direction as the acceleration turbine (721). This rotation is ensured by the liquid coming from the accelerating turbine (721) and the angle of the blades of the braking turbine (730).

Braking:

As seen on the FIG. 2, when the braking turbine axle moves to the left to perform braking the reverse rotation direction mechanism, (the cone or other gear type (700) and the reverse rotation direction disk (741)), is used to connect the freely rotating braking turbine (730) with the sitting on the extended wheel's axle disk (742).

That makes the braking turbine (730) to start rotating in the direction opposite to the rotation of the wheel (743). The angle of the turbine's blades affect the liquid to be pushed in the direction opposite to where it came from, i.e. in the direction shown in (7230) towards the accelerating turbine (721), which is sitting on, and is being locked to the extended wheel axle (724). The liquid is now pressing against the rotation of the accelerating turbine (721) and therefore against the rotation of the wheel (743), which in turn is causing the automobile to brake, while compressing the air, as shown by the (7300). Additionally, —at the time when the breaking turbine axle moves to the left to perform braking, air pumping pistons (709) get connected to the power-train axle.

What is claimed:

1. A system for a recovering energy wheel implementing an energy conservation device comprising:
    (a) one or more braking turbines (30) sitting on a wheel's axle or on an extended wheel axle (24) and located in a housing of the system;
    (b) one or more accelerator turbines (21) sitting on the wheel's axle or on the extended wheel axle (24) and located in the housing of the system;
    (c) one or more accumulators (10) located in the housing of the system, utilizing compressed gas and liquid;
    (d) a connector to an original hub (41);
    wherein each accumulator (10) has an accelerator valve (A) and a braking valve (B) attached to it;
    wherein the pressure in the accumulator is achieved by the presence of special blocks set on a path of the moving liquid, which special blocks are moved in and out of the path synchronously with revolution of the braking turbine blades;
    wherein the braking turbine (30) pushes the liquid into the accumulator at a braking time when the braking valve (B) is open and the accelerator valve (A) is closed;
    wherein the accelerator turbine (21) is propelled by pressurized liquid coming out of the accumulator (10) at the acceleration time when the braking valve (B) is closed and the accelerator valve (A) is opened.

2. The system of claim 1, wherein the blades of the one or more accelerator turbines act as gear.

3. The system of claim 1, further comprising a secondary hub (44) attached to the axle or the extended axle.

4. A method of adding the system of claim 3 to a vehicle's drive train by the following steps:
    (a) taking off an original wheel (43);
    (b) attaching the system with the secondary hub (44) to the original hub (40);
    (c) attached the original wheel to the secondary hub (44).

* * * * *